US006473078B1

United States Patent
Ikonen et al.

(10) Patent No.: US 6,473,078 B1
(45) Date of Patent: Oct. 29, 2002

(54) METHOD AND DEVICE FOR POWER CONSUMPTION MANAGEMENT OF AN INTEGRATED DISPLAY UNIT

(75) Inventors: Raimo Ikonen, Salo; Jari Pistemaa, Hiisi; Turo Rantanen; Anders Engberg, both of Salo, all of (FI)

(73) Assignee: Nokia Display Products Oy, Salo (FI)

( * ) Notice: Subject to any disclaimer, the term of this patent is extended or adjusted under 35 U.S.C. 154(b) by 0 days.

(21) Appl. No.: 09/320,618

(22) Filed: May 26, 1999

(51) Int. Cl.$^7$ ................................................ G09G 5/00
(52) U.S. Cl. .................... 345/211; 345/10; 345/212; 345/213; 315/209 R; 315/225; 348/377; 348/378; 348/730; 713/300; 713/310
(58) Field of Search ................... 345/10, 211–213, 345/156, 520; 315/209 R, 225; 348/377, 378, 730; 713/300, 310, 320–324, 330, 340

(56) References Cited

U.S. PATENT DOCUMENTS

| 5,389,952 | A | | 2/1995 | Kikinis | 345/212 |
| 5,396,635 | A | * | 3/1995 | Fung | 713/323 |
| 5,586,333 | A | * | 12/1996 | Choi et al. | 713/320 |
| 5,648,799 | A | | 7/1997 | Kikinis | 345/212 |
| 5,781,250 | A | | 7/1998 | Jun | |
| 5,821,924 | A | | 10/1998 | Kikinis et al. | 345/212 |
| 5,870,086 | A | | 2/1999 | Bang | |
| 5,880,719 | A | | 3/1999 | Kikinis | 345/212 |
| 5,938,770 | A | * | 8/1999 | Kim | 713/300 |
| 6,069,619 | A | | 5/2000 | Kim | |
| 6,097,378 | A | * | 8/2000 | Song | 345/211 |
| 6,115,033 | A | * | 9/2000 | Choi | 345/210 |
| 6,147,682 | A | * | 11/2000 | Kim | 345/211 |
| 6,243,821 | B1 | * | 6/2001 | Reneris | 713/323 |
| 6,275,221 | B1 | * | 8/2001 | Song | 345/210 |
| 6,345,364 | B1 | * | 2/2002 | Lee | 713/324 |

FOREIGN PATENT DOCUMENTS

| EP | 0901062 | 3/1999 |
| JP | 10116139 | 5/1998 |

OTHER PUBLICATIONS

"Display Device Class", Draft proposal v0.9, Microsoft Corp. 1996, pp. 3–5.
VESA DPMS Standard, Display Power Management Signaling (DPMS) Standard, Aug. 20, 1993, pp. 4–12.
European Patent Office Search Report dated Nov. 26, 2001 (4pp).
"Increasing Lifetime and Reliability of CRT Displays," IBM Technical Disclosure Bulletin, vol. 34, No. 9, Feb. p. 281–283.

\* cited by examiner

*Primary Examiner*—Richard Hjerpe
*Assistant Examiner*—Henry N. Tran
(74) *Attorney, Agent, or Firm*—Ware, Fressola, Van Der Sluys & Adolphson LLP

(57) ABSTRACT

A method and a device for power management regarding an integrated display unit including a video display and at least one peripheral device, wherein the video display uses horizontal and vertical sync signals for the synchronization of the display images, and the peripheral device uses a peripheral signal to carry out its function. The peripheral device can be an audio unit using audio signals to produce sound. The peripheral device can be a USB connector using a +5 V voltage to indicate a connection being made to the integrated display unit. In the integrated display unit, a single power supply is used to provide electrical power to the video display and the peripheral device. In order to reduce the power consumption by the integrated display unit, a number of power consumption states, based on the presence of the video sync signals and the peripheral signals, are implemented. The presence of the video sync signals can be detected by a micro-controller in the integrated display unit. Alternatively, the presence of the video sync signals or data indicating power save states is signaled to the integrated display unit via USB BUS or other digital communication mean. Likewise, audio signals can be sent as digital data via USB BUS to the integrated display unit.

20 Claims, 4 Drawing Sheets

METHOD AND DEVICE FOR POWER CONSUMPTION MANAGEMENT OF AN INTEGRATED DISPLAY UNIT

FIELD OF THE INVENTION

The present invention relates to a method and a device for power management in a display unit such as a PC monitor which uses a CRT for information display.

BACKGROUND OF THE INVENTION

The electrical energy consumed by a video display is mostly, if not completely, converted into heat energy that warms up the room in which the display device is placed. The conversion of electrical energy into heat energy in this way is indeed wasteful, especially when the video display is not being used to provide any visual information.

It is well-known that PC monitors are generally provided with a power saving scheme such that when the PC is not in use after a certain period of time, the power supply in the monitor will be switched from a regular "ON" mode to a suspend mode or a stand-by mode to save energy. One of the known standards for power saving is the VESA Display Power Management Signaling (DPMS) Standard. With the VESA standard, the video display is put into different energy-saving states by means of a coded message, based on the present status such as the presence or absence of the vertical sync and horizontal sync signals, as shown in Table 1. With the presence or absence of the video sync signals in different combinations, there are four possible power level states to be set. The ON state is referred to when the display is in full operation, being used to show an image. In the Stand-by state, no image is shown and the power consumption is somewhat reduced while allowing the CRT to return to normal quickly once the PC is again active. In the Suspend state, no image is shown and the power consumption is further reduced but the recovery time for the CRT is longer. In the OFF state, the display is non-operational but a very low level of power is maintained to keep certain electronic components active. These power saving states are further summarized in Table 2, according to the Advance Power Management (APM) specification. The APM specification is set forth by the computer industries for the power management of personal computers, and the specification is provided in the system BIOS, operating system or application software.

TABLE 1

Display Power Mangement Summary

| State | Signals | | | DPMS Compliance Requirement |
|---|---|---|---|---|
| | Horizontal | Vertical | Video | |
| On | Pulses | Pulses | Active | Mandatory |
| Stand-by | No Pulses | Pulses | Blanked | Optional |
| Suspend | Pulses | No Pulses | Blanked | Mandatory |
| Off | No Pulses | No Pulses | Blanked | Mandatory |

TABLE 2

APM State Summary

| APM state | Power Savings | Recovery Time |
|---|---|---|
| On | None | Not Applicable |
| Stand-by | Minimal | Short Recovery |
| Suspend | Substantial | Longer Recovery Allowed |
| Off | Maximum | System Dependent |

In an integrated display unit, in addition to the video display, some audio-visual components such as audio amplifier, speakers, microphone, camera and telephone handset may also be included. Integrated display units are also referred to as "multimedia terminals". Like the CRT, the added-on components require adequate electrical power to function properly. Currently, audio components and the camera in an integrated display unit draw power from separate power supplies. These extra power supplies not only increase the cost of an integrated display unit, but also require more space and more power outlets. Therefore, it is desirable to allow these added-on peripheral devices to share a power supply with the CRT. With these added-on components, however, it may not be appropriate to switch the power supply to different power saving states based solely on the present status, e.g., the presence or absence of the video sync signals. Even when the PC is not in an active mode, e.g. the keyboard or the mouse has not been used for a prolonged period, it should not be assumed that all the peripheral devices are also inactive. For example, in a teleconferencing environment, the PC may be completely inactive for a long period of time while the camera is still taking pictures of the conference participants and the audio components are still processing the conversation of the participants. In that case, the power supply in the integrated display unit should not be caused to enter a low power output state that may render the camera and the audio components non-operational. Also, when an integrated display unit is connected to a Universal Serial Bus (USB) hub, or when the integrated display unit is used as a USB hub, the power supply in the integrated display unit should be controlled differently. Furthermore, if the video display in an integrated display unit is also used to display the images acquired by an added-on camera, the image signals from the camera should also be considered as part of the video sync signals.

It is advantageous to provide a method and a device to control the power consumption in an integrated display unit that includes one or more peripheral devices, wherein the peripheral devices may be kept active even when one or more of the video synchronization signals are not present for a certain period of time.

SUMMARY OF THE INVENTION

It is an objective of the present invention to provide a method and a device to reduce the consumption of electrical power by an integrated display unit and to make power management more practical.

This objective can be achieved by reducing the number of power supplies in an integrated display unit, preferably to one, and by providing a power management strategy based on the signals associated with the peripheral devices as well as the video sync signals. Preferably, the power management strategy, according to the present invention, is in compliance with the VESA DPMS Standard, as summarized in Table 3.

TABLE 3

Power Management Summary

| STATE | H_s | V_s | Pwr_$\bar{u}$ | Pwr_o | Pwr_$\bar{s}$ | Functions | Wattage |
|---|---|---|---|---|---|---|---|
| 1. POWER ON | 1 | 1 | x | 1 | 1 | Note 1 | <130 W |
| 2. STANDBY | 0 | 1 | x | 1 | 1 | Note 2 | <90 W |
| 3. SUSPEND | 1 | 0 | x | 1 | 0 | Note 3 | <10 W |
| 4. PD | 0 | 0 | 0 | 1 | 0 | Note 4 | <8 W |
| 5. PWR OFF | 0 | 0 | 1 | 0 | 0 | Note 5 | <5 W |
| 6. KEY OFF | x | x | x | x | x | Note 6 | <0.5 W |

In accordance with the Power Management Summary as shown in Table 3, there are five power consumption states, POWER ON, STANDBY, SUSPEND, PD (Peripheral Device) and PWR OFF, with each state having a different level of power consumption. It is understood that these power consumption states exist only after the power switch of the integrated display unit has been turned on. If the power switch is not turned on, the external electrical power source to the power supply is completely cut off, as denoted by the "KEY OFF" state.

The implementation of different power consumption states is determined by the status, e.g., the presence or absence of the various signals sensed by a plurality of signal detectors in the integrated display unit as described below:

The POWER ON state is implemented when both the horizontal sync signal and the vertical sync signal are present. In this state, video images are shown on the display and the power consumption for example which follows is about 130 W.

The STANDBY state is implemented when the vertical sync signal is present but the horizontal sync signal is not present. Even though no video image is shown, the CRT remains heated for quick recovery. The power consumption is reduced to about 90 W by switching video power amplifier off thereby blanking video output.

The SUSPEND state is implemented when the horizontal sync signal is present but the vertical sync signal is not present. No video image is shown. The CRT filament is heated at a much lower voltage level to save energy and deflection is turned off. The total power consumption is thereby further reduced to about 10 W.

The PD state is implemented when signals associated with one or more peripheral devices, including a USB signal, are present but both the horizontal sync signal and the vertical sync signal are absent. The CRT filament is not heated. Power consumption is typically 8 W, but it can be more or less depending on the peripherals in the integrated display unit.

The PWR OFF state is implemented when no incoming signals are present. The power consumption of about 5 W is mainly for keeping signal detectors active. If there is an audio preamplifier in the integrated display unit, it is preferable to keep the preamplifier operational. However, generally this is not required.

In order to effect the power reduction in different power consumption states, the power supply is caused to enter different output modes. According to the present invention, the output modes include at least a high-output mode and a suspend output mode. The power supply is in the high-output mode when the power consumption level is either at the POWER ON or the STANDBY state. The power supply is in the suspend output mode when the power consumption level is either at the SUSPEND or the PD state. The power supply is caused to enter different output modes based on the status, e.g., the presence or absence of various signals as described in the following:

The power supply is caused to enter the high output mode whenever the vertical sync signal is present;

the power supply is caused to enter the suspend output mode when the vertical sync signal is not present but one or more of the other signals are present;

the power supply is electronically turned off when no incoming signals are present.

As can be seen from Table 3, the implementation of the power consumption states and the output modes of the power supply are effected by three control signals: Pwr_$\bar{u}$, Pwr_o, and Pwr_$\bar{s}$. These control signals are produced by a variety of signal detectors which sense the presence of the video sync signals and the peripheral signals.

The Pwr_$\bar{u}$ signal is set at a "0" or LOW state when any peripheral signal is present, and at a "1" or HIGH state when no peripheral signals are present.

The Pwr_o signal is set at a "1" or HIGH state when any of the horizontal sync signal, the vertical sync signal and the peripheral signal is present, and at a "0" or LOW state when none of these signals are present.

The Pwr_$\bar{s}$ signal is set at a "1" or HIGH state only when the vertical sync signal is present.

The method and device for effecting the reduction of power consumption in an integrated display unit will become apparent upon reading the drawings and the accompanying descriptions.

DETAILED DESCRIPTION OF THE INVENTION

Figure 1:
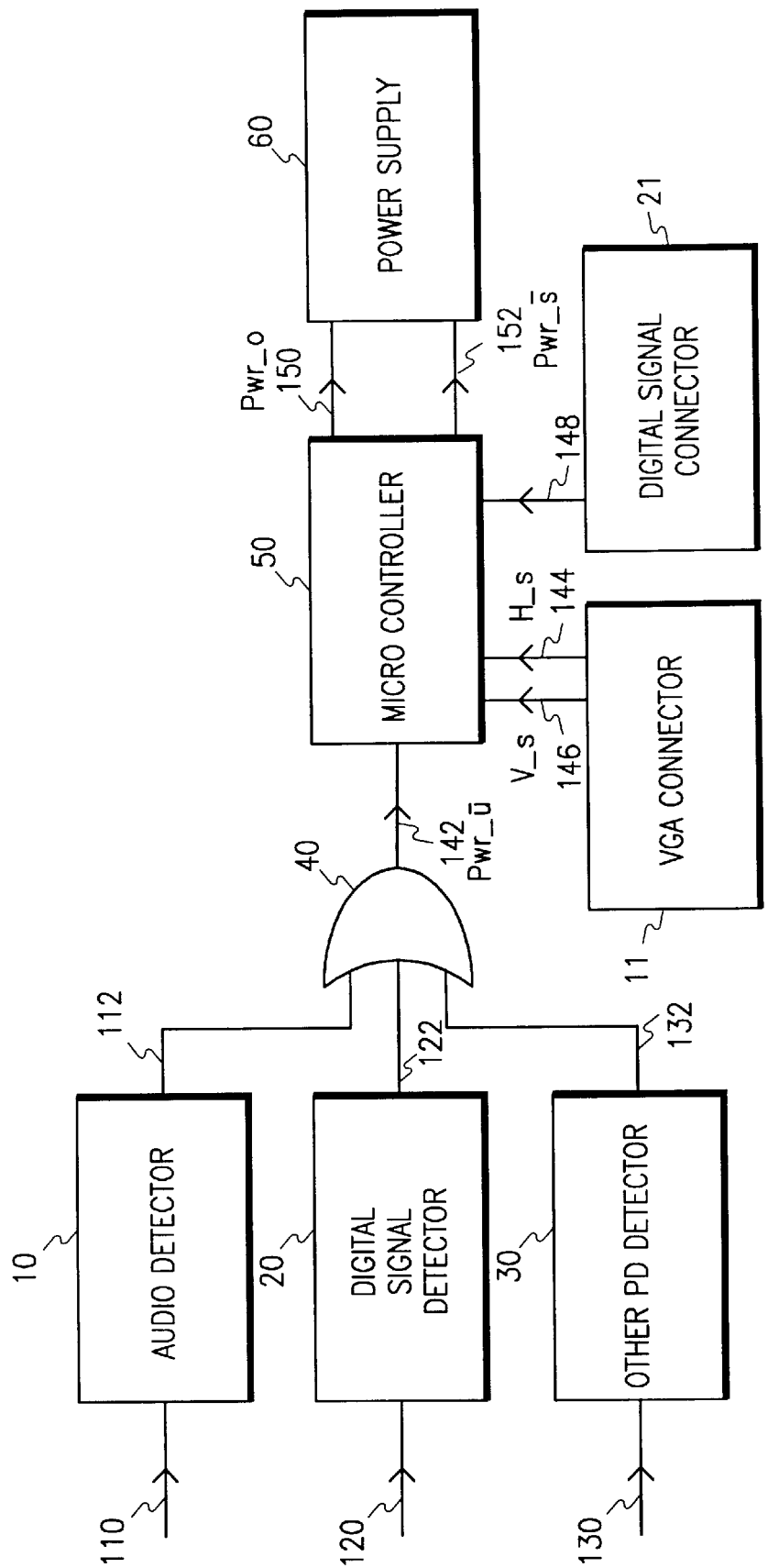
FIG. 1 illustrates a block diagram showing some electronic components to be used to control a single power supply which supplies electrical power to the video display and at least one added-on peripheral device in an integrated display unit.

FIG. 1 illustrates a block diagram showing some electronic components for detecting incoming signals and controlling a power supply. In FIG. 1, there are shown a number of peripheral detectors being used to detect or sense the presence of different peripheral signals. As shown, an audio detector 10 is used to detect audio signals 110 and to provide a signal 112 to a logic circuit 40, indicating whether audio signals are present. A digital signal detector 20 is used to detect a signal 120 which indicates whether a USB cable or other digital communication means is connected to the CPU or the integrated display unit. The digital signal detector 20 provides a signal 122 to the logic circuit 40 accordingly. Likewise, one or more PD detectors 30 may be used to detect the presence of other peripheral signal 130 associated with other peripheral devices, such as cameras and telephones, and to provide a signal 132 to the logic circuit 40. When one or more of the signals associated with the peripheral devices on the integrated display unit are detected, the logic circuit 40 "notifies" a micro-controller 50 the presence of such signals by means of a Pwr_$\bar{u}$ signal 142. The Pwr_$\bar{u}$ signal is set at a "0" or LOW state when peripheral signals are present and at a "1" or HIGH state otherwise. Based on the status of the Pwr_$\bar{u}$ signal 142 and the video sync signals 144 and 146 which are provided through a VGA connector 11, the micro-controller 50 provides different combinations of a Pwr_o signal 150 and a Pwr_$\bar{s}$ signal 152 to the power supply 60. The Pwr_o signal 150 is used to electronically turn the power supply 60 on or off. The Pwr_o signal 150 turns on the power supply 60 when it is set at a "1" or HIGH state, indicating that one or more signals associated with the peripheral devices and the video display are present. The Pwr_$\bar{s}$ signal 152 is used to cause the power supply 60 to enter different output modes. The Pwr_$\bar{s}$ signal 152, being set a "1" or HIGH state only when the vertical sync signal is present, causes the power supply to enter a high-output mode. Otherwise, the power supply is in a suspend output mode. This output mode is implemented even when no images are shown on the monitor. However, background music may be playing, for example. In that case, a certain level of power is needed to supply electrical power to the speakers on the integrated display and, therefore, the power supply must be turned on.

After the power supply has been electronically turned on, it can be caused to enter the high-output mode or in the suspend output mode, depending on the power saving scheme. As can be seen in Table 3, whenever the vertical sync signal is present, the power consumption is either at the POWER ON state or the STANDBY state and the power supply must be caused to enter the high-output mode in order to heat up the CRT filament properly. Thus, when the V_s is "1" or HIGH, the Pwr_$\bar{s}$ signal 152 is always HIGH, causing the power supply to enter the high-output mode. When the vertical sync signal is not present but the horizontal sync signal is present, the SUSPEND power consumption state is implemented to save more energy. The same is true when only the peripheral signals are present. When no incoming signals are present, the power supply is electronically turned off.

It is possible that the presence of sync signals or data indicating power save states is signaled to the micro-controller 50 by a signal 148 provided through a digital signal connector 21. Connector 21 can be a USB connector, for example. Accordingly, the micro-controller 50 receives power management commands from the PC or CPU. The power management commands can be sent to an integrated display unit in the form of digital data via a USB BUS and/or other digital communication means to implement the power consumption states. Therefore, there may not be necessary to send the video sync signals to the micro-controller 50 and the VGA connector 11 can be removed, if so desired. Furthermore, audio signals 110 can also be conveyed to the integrated display unit via a USB BUS through USB connector 21. In that case, the audio detector 10 is no longer needed for detecting incoming audio signals. In the case that USB BUS is used to provide audio signals or other peripheral signals, the Pwr_$\bar{u}$ signal can be generated by the micro-controller 50, or by the logic circuit 40 when the +5V voltage level associated with the USB connection is detected by the digital signal detector 20.

Figure 2:
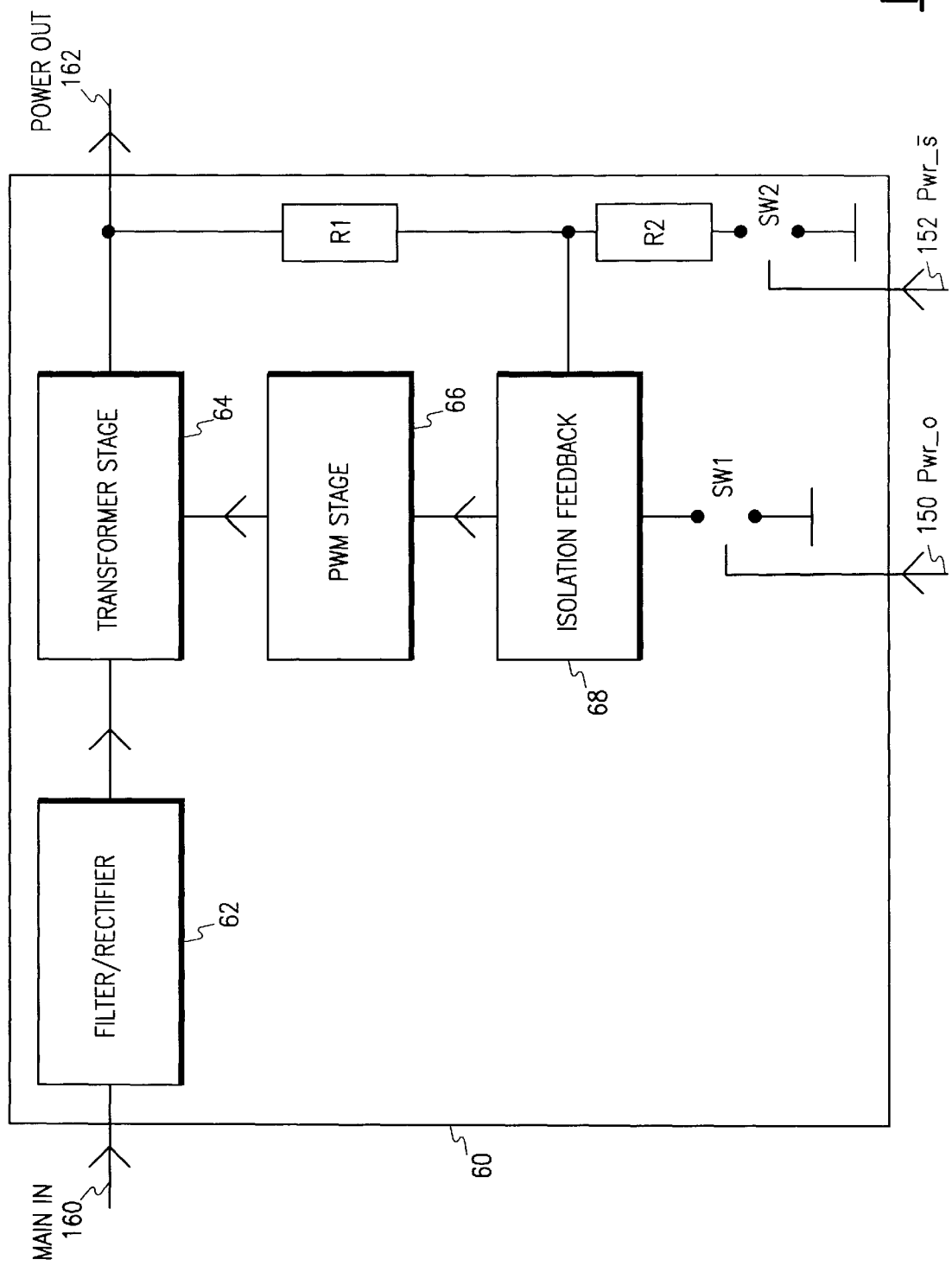
FIG. 2 illustrates a schematic diagram of a power supply that can be caused to enter different output modes.

FIG. 2 illustrates a schematic diagram of a power supply that may be caused to enter different output modes. The power supply 60 shown in FIG. 2 is a flyback-type switched mode power supply, also known as a switching power supply. Within the power supply, there is a filter/rectifier unit 62 to convert an AC line voltage 160 (MAIN IN) into a DC component. A Pulsed Width Modulation (PWM) stage 66 is used to provide chopped voltage signals to a transformer/power stage 64 which produces an isolated voltage output 162 (POWER OUT). A voltage divider (R1, R2) is used to provide a feedback signal to an isolation feedback unit 68, which is used to control the pulse width of the PWM stage 66. Thus, the output voltage 162 is controllable by the feedback voltage. In the power supply, there are two transistor switches SW1 and SW2 to control the power output. SW1 is closed to electronically turn on the power supply when the Pwr_o signal 150 is set at a "1" or HIGH state. At this state, when both SW1 and SW2 are closed, the power supply is caused to enter the high-output mode and the voltage output 162 is typically 180V, for example.

When SW1 is closed but SW2 is open, the power supply is caused to enter the suspend output mode and the voltage output 162 is substantially equal to 140V, for example. At this mode, the output voltage is set at a low level but is sufficient to preheat the CRT filament and to allow the peripheral devices to function properly. But when the vertical sync signal is present, it is required that either the POWER ON or STANDBY power consumption state be implemented. When V_s is HIGH, Pwr_$\bar{s}$ is also HIGH, causing switch SW2 to be closed. When that happens, the feedback voltage, via voltage divider R1 and R2, provided to the isolation feedback unit 68 is reduced. Consequently, the power supply "assumes" that the output voltage 162 is too low, and the isolation feedback unit 68 causes the PWM stage 66 to increase the pulse width or the voltage chopping rate, thereby raising the output voltage 162.

When none of the sync signals and peripheral signals are present, both Pwr_o signal 150 and the Pwr_$\bar{s}$ signal 152 are LOW, keeping both SW1 and SW2 open. In that case, the power supply is electronically turned off, and the output voltage 162 is dropped substantially 20V, for example. The power consumption is now in the PWR OFF state. Some power is still needed to keep all the peripheral detectors 10, 20, 30, the logic circuit 40 and the micro-controller 50 active so as to allow these components to sense the incoming signals. The voltage output 162 is 0V when the power key is turned off (the KEY OFF state in Table 3).

Figure 3:
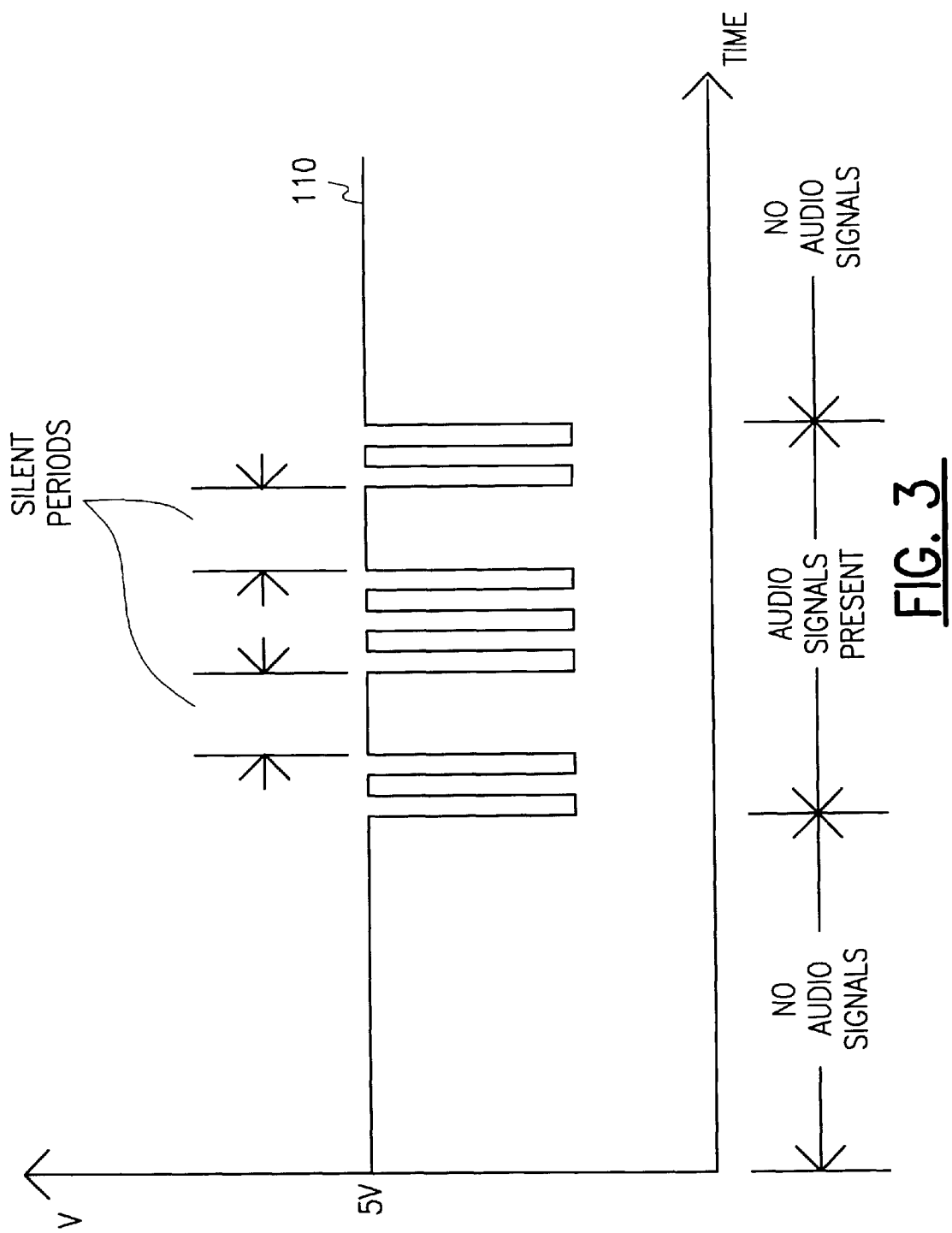
FIG. 3 illustrates a simplistic representation of audio signals.
Figure 4:
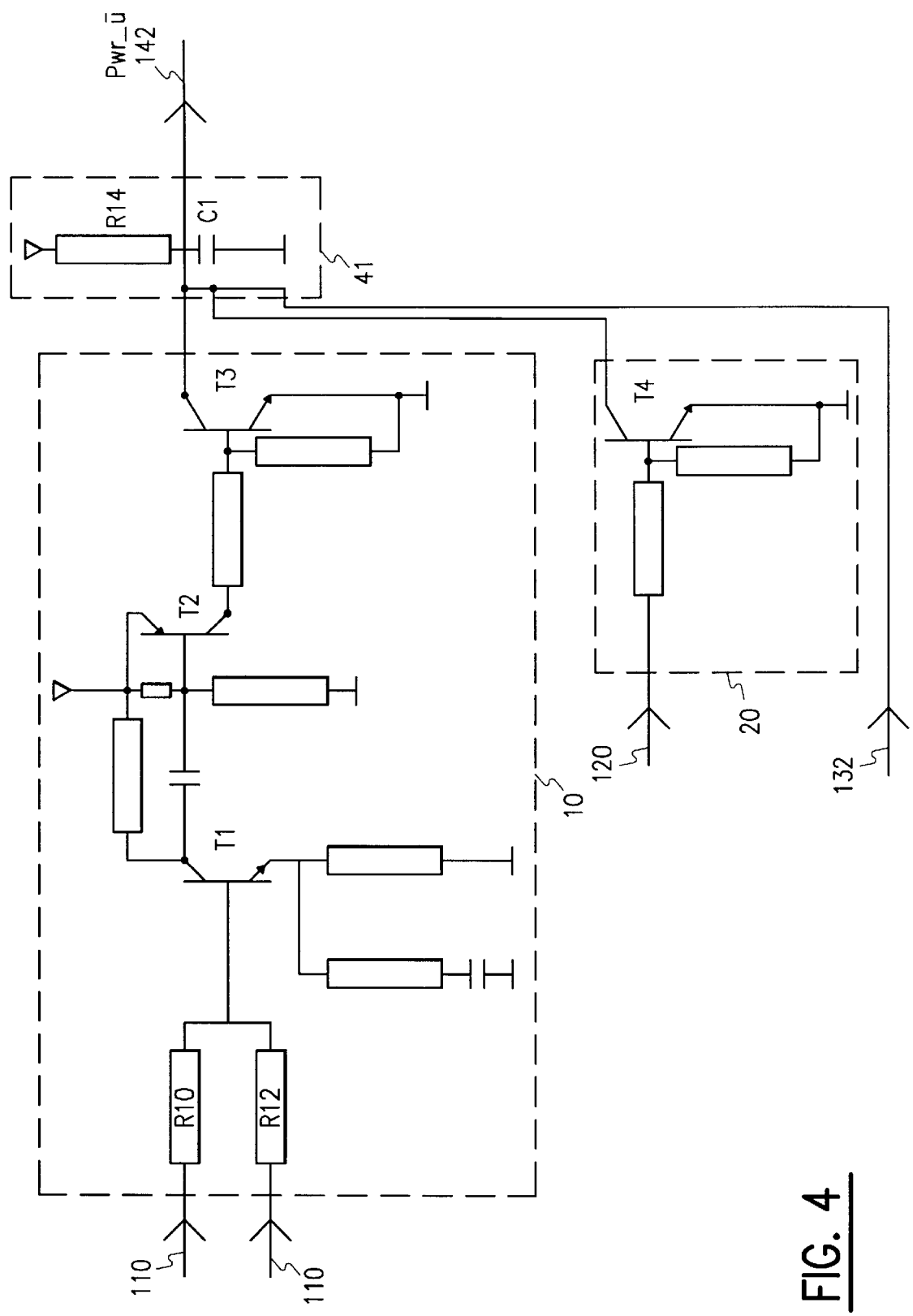
FIG. 4 illustrates a representative electronic circuit for peripheral signal detection.

FIG. 3 illustrates a simplistic representation of audio signals. Audio signals mainly carry voice or music. In FIG. 4, audio signals 110 are LOW when voice or music is present. When the signal level is HIGH for a relatively long period of time, it is safe to assume that there are no incoming audio signals. However, music and conversation have silent periods and it may not be desirable to switch off the power supply whenever audio signals are absent. It is, therefore, preferable to allow the power supply to be kept on for a certain period of time, from a few seconds to 1 minute, to cover the silent period.

FIG. 4 illustrates a representative circuit for detecting peripheral signals. In FIG. 4, there are shown an audio detector 10 and a USB detector 20. When there are no peripheral signals, including the USB signal, capacitor C1 in block 41 (which is equivalent to the logic circuit 40 in FIG. 1) is charged up to +5V. Thus, the Pwr_$\bar{\text{u}}$ signal 142 is set at a "1" or HIGH state. If a USB cable is now connected to the integrated display and a +5V signal level, or Vcc from an upstream port, is present as signal 120, the signal level 122 at the output of transistor T4 drops substantially to 0V, discharging capacitor C1 and setting the Pwr_$\bar{\text{u}}$ signal 142 at a "0" or LOW state. Consequently, the power supply is electronically turned on.

Similarly, when audio signals are present as signal 110, the audio detector 10 is biased via resistors R10 and R12. The audio signals, as amplified by transistors T1, are provided to transistor T2 which is biased to rectify audio signals. Transistor T3 makes current gain, effectively grounding signal 112 and causing C1 to discharge.

It should be noted that the output stages of audio detector 10 and the USB detector 20 are open collector type (T3, T4, etc). It is possible to connect several detectors in parallel using the same pull-up resistor R14 in block 41.

The present invention has been described with respect to the preferred versions and embodiments thereof. It should be noted that the drawing figures are for illustrative purposes only. Therefore, it will be understood by those skilled in the art that the foregoing and various other changes, omissions and deviations in the form and detail thereof may be made without departing from the spirit and scope of this invention.

What is claimed is:

1. In an integrated display unit having a video display for displaying images, at least one peripheral device having a first signal associated therewith, and a power supply to supply electrical power to both the video display and said at least one peripheral device, wherein the video display uses a horizontal sync signal and a vertical sync signal for the synchronization of the displayed images, a method for reducing the power consumption of the integrated display unit by implementing a plurality of power consumption states, each state having a different level of power consumption, said method comprising the steps of:

sensing the status of the horizontal sync signal, the vertical sync signal and the first signal; and determining the power consumption state to be implemented based on the status of the horizontal sync signal, the vertical sync signal and the first signal.

2. The method of claim 1 wherein the power consumption states includes a first state, a second state, a third state, a fourth state and a fifth state in the order of the power consumption level wherein the fifth state has the lowest level of power consumption, and wherein the first state is implemented when both the horizontal sync signal and the vertical sync signal are present;

the second state is implemented when the vertical sync signal is present and the horizontal sync signal is not present;

the third state is implemented when the horizontal sync signal is present and the vertical sync signal is not present;

the fourth state is implemented when the first signal is present but both the horizontal sync signal and the vertical sync signal are not present; and the fifth state is implemented when none of the horizontal sync signal, and vertical sync signal and the first signal are present.

3. The method of claim 1 wherein said at least one peripheral device comprises an audio device and said first signal comprises audio signals.

4. The method of claim 3 wherein said audio signals are provided to the integrated display unit via a USB connection means.

5. The method of claim 1 wherein said at least one peripheral device comprises a USB connection means and said first signal comprises a voltage level associated with the USB connection means.

6. The method of claim 1 wherein said at least one peripheral device comprises a USB connection means, and the power consumption state to be implemented is signaled via said USB connection means to the integrated display unit.

7. The method of claim 1 wherein the power consumption states are associated with at least two output modes of the power supply, said output modes including a high output mode and a suspend output mode and wherein the power supply is caused to enter the high output mode when the vertical sync signal is present; and the power supply is caused to enter the suspend output mode when the vertical sync signal is not present but either or both of the horizontal sync signal and the first signal are present.

8. The method of claim 1 wherein the presence of vertical sync signal and/or horizontal sync signal is signaled to the integrated display unit via a USB connection means.

9. The method of claim 1, wherein the status of the first signal is variable during a period when a key is not used to affect the first signal.

10. In an integrated display unit having a video display for displaying images, at least one peripheral device, and a power supply to supply electrical power to both the video display and said at least one peripheral device, wherein the video display uses a horizontal sync signal and a vertical sync signal for the synchronization of the displayed images and wherein said at least one peripheral device uses a first signal to carry out a function associated with said peripheral device, a method for reducing the power consumption of the integrated display unit by causing the power supply to enter different output modes comprising the steps of:

sensing the status of the horizontal sync signal, the vertical sync signal and the first signal;

causing the power supply to enter different output modes based on the status of the horizontal sync signal, the vertical sync signal and the first signal.

11. The method of claim 10 wherein said at least one peripheral device comprises a USB connection means, and the presence of the horizontal sync signal and the vertical sync signal is signaled to the integrated display unit via said USB connection means.

12. The method of claim 10 wherein the power supply is caused to enter a high output mode when the vertical sync signal is present and the power supply is caused to enter a suspend output mode when the vertical sync signal is are not present but either or both of the horizontal sync signal and the first signal are present.

13. The method of claim 10, wherein the status of the first signal is variable during a period when a key is not used to affect the first signal.

14. In an integrated display unit having a video display for displaying images, at least one peripheral device, and a power supply to supply electrical power to both the video display and said at least one peripheral device, wherein the display uses a horizontal sync signal and a vertical sync signal for the synchronization of the displayed images and wherein said at least one peripheral device has a first signal associated with said peripheral device, wherein the power supply is caused to enter different output modes for reducing power consumption of the integrated display unit, a device for effecting the reduction of the power consumption comprising:

means for sensing the status of the horizontal sync signal, the vertical sync signal and the first signal; and an electronic circuit to determine the output modes based on the status of the horizontal sync signal, the vertical sync signal and the first signal.

15. The device of claim 14 wherein the power supply is caused to enter a high output mode when the vertical sync signal is present and the power supply is caused to enter a suspend output mode when the vertical sync signal is not present but either or both of the horizontal sync signal and the first signal are present.

16. The device of claim 14 wherein said sensing means comprises a micro-controller.

17. The device of claim 14 wherein said at least one peripheral device comprises an audio device and said first signal comprises audio signals, and said sensing means comprises an audio signal detector.

18. The device of claim 14 wherein said at least one peripheral device comprises a USB connection means and said first signal comprises a voltage level associated with the USB connection means, and said sensing means comprises a USB detector.

19. The device of claim 14 wherein said at least one peripheral device comprises a USB connection means and the output modes are effected by a signal provided via said USB connection means to the integrated display unit.

20. The device of claim 14, wherein the status of the first signal is variable during a period when a key is not used to affect the first signal.

* * * * *